Figure 1:
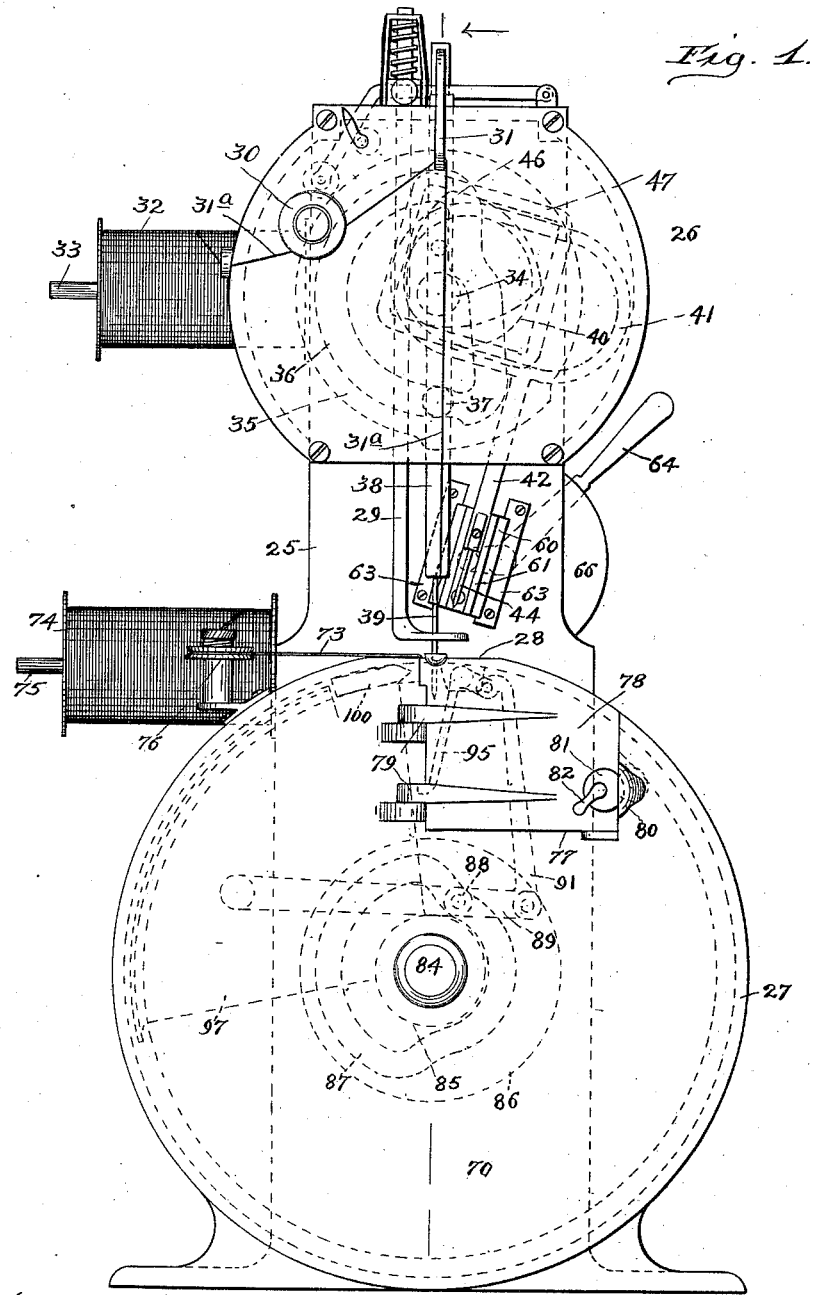

R. H. RUDOLPH.
AUTOMATIC LEATHER STITCHING MACHINE.
APPLICATION FILED OCT. 17, 1910.

1,019,364.

Patented Mar. 5, 1912.
6 SHEETS—SHEET 4.

Witnesses
Chas. E. Gorton
J. E. Hansen

Inventor:
Raymond H. Rudolph.
By Chas. C. Tillman
Atty.

R. H. RUDOLPH.
AUTOMATIC LEATHER STITCHING MACHINE.
APPLICATION FILED OCT. 17, 1910.
1,019,364.
Patented Mar. 5, 1912.
6 SHEETS—SHEET 5.
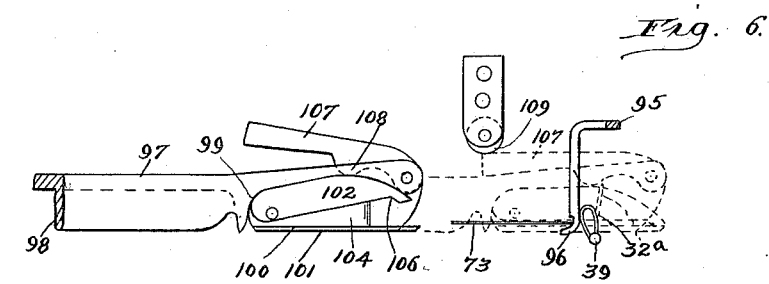
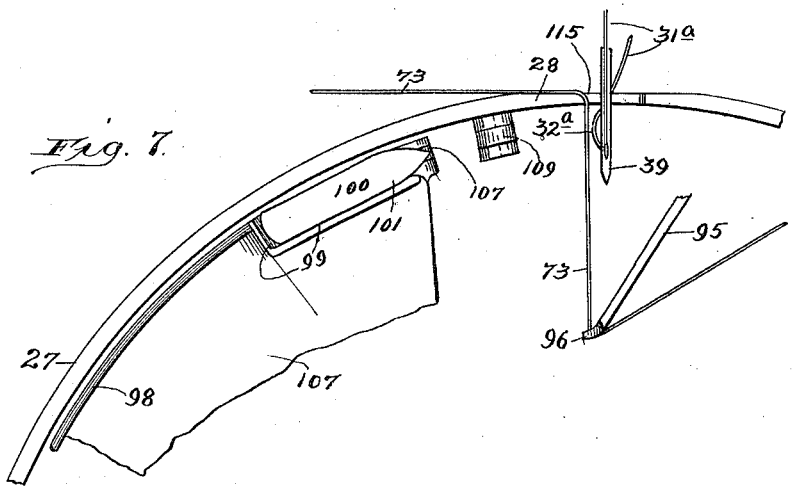
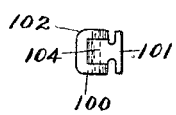
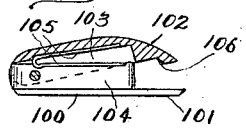
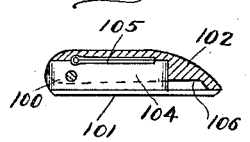
Witnesses:
Chas. E. Gorton
J. E. Hansen
Inventor:
Raymond H. Rudolph
By Chas. C. Tillman
Atty.
COLUMBIA PLANOGRAPH CO., WASHINGTON, D. C.

R. H. RUDOLPH.
AUTOMATIC LEATHER STITCHING MACHINE.
APPLICATION FILED OCT. 17, 1910.
1,019,364.
Patented Mar. 5, 1912.
6 SHEETS—SHEET 6.
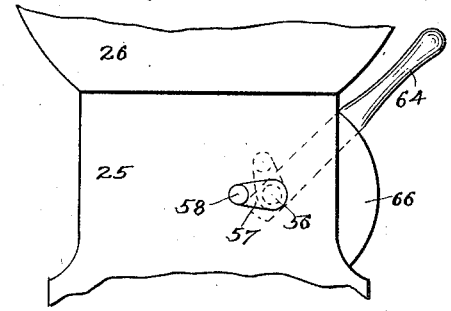
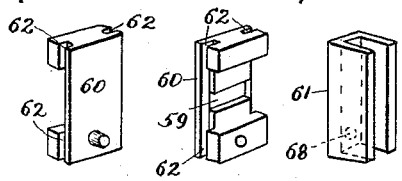
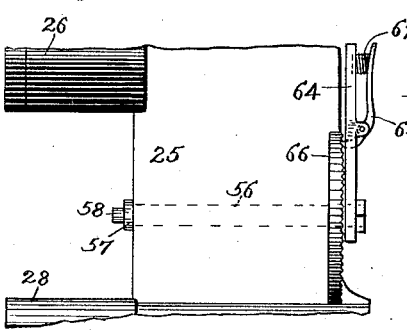
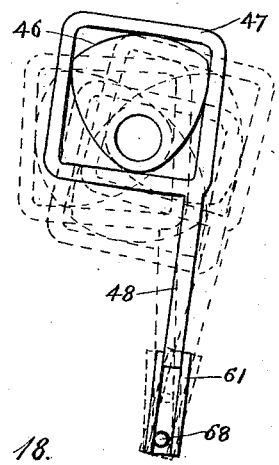
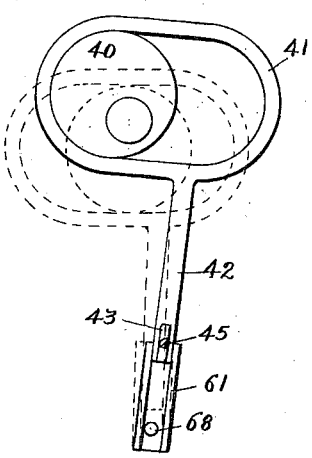
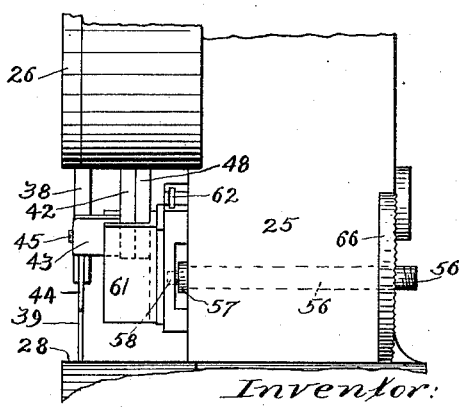
Witnesses:
Chas. E. Gorton
J. E. Hansen
Inventor:
Raymond H. Rudolph
By Chas. C. Tillman
Atty.

UNITED STATES PATENT OFFICE.

RAYMOND H. RUDOLPH, OF ELGIN, ILLINOIS.

AUTOMATIC LEATHER-STITCHING MACHINE.

1,019,364. Specification of Letters Patent. Patented Mar. 5, 1912.

Application filed October 17, 1910. Serial No. 587,459.

*To all whom it may concern:*

Be it known that I, RAYMOND H. RUDOLPH, a citizen of the United States, residing at Elgin, in the county of Kane and State of Illinois, have invented certain new and useful Improvements in Automatic Leather-Stitching Machines, of which the following is a specification.

This invention relates to improvements in a machine which is designed more particularly for stitching or sewing together the parts of shoes in the manufacture or repairing thereof, yet it is applicable for stitching or sewing other articles, such as the parts of harness, saddles and leather goods, as well as goods of other material, and is of that type in which an awl is employed above the leather or fabric, together with a presser-foot, and a needle, the awl serving to perforate the leather or work and feed it; the needle being subsequently introduced through the hole made by the awl and assisting in making a stitch; while the presser-foot holds the leather or work firmly in place; and the invention consists in certain peculiarities of the construction, novel arrangement and operation of the various parts thereof, as will be hereinafter more fully set forth and specifically claimed.

The objects of my invention are somewhat similar to those set forth in an application for Letters-Patent for improvements in an automatic leather stitching machine, filed by me on the 29th day of January, 1910, and bearing Serial Number 540,799, that is to say, to provide a machine of the above-named character, which shall be simple in construction, strong, durable and efficient in operation and so made as to dispense with the use of a bobbin, thereby saving much time and labor, which, is required in winding or threading the same.

Another object is to provide a stitching machine the parts of which shall be so constructed and arranged, that both the needle and awl will be operatively located above the support for the leather or work, to the end, that the needle may be in view of the operator.

Various other objects and advantages of the invention will be disclosed in the subjoined description and explanation.

Figure 2:
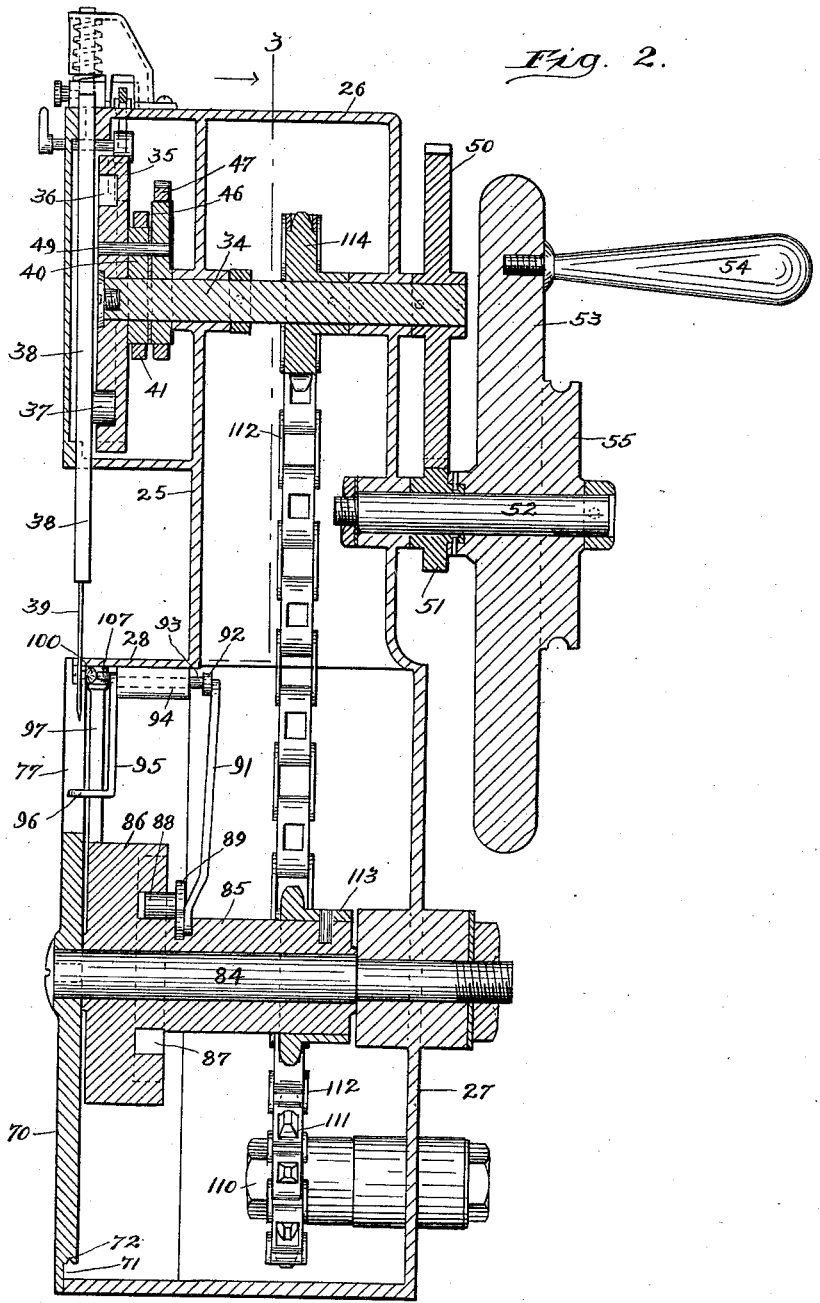
Figure 3:
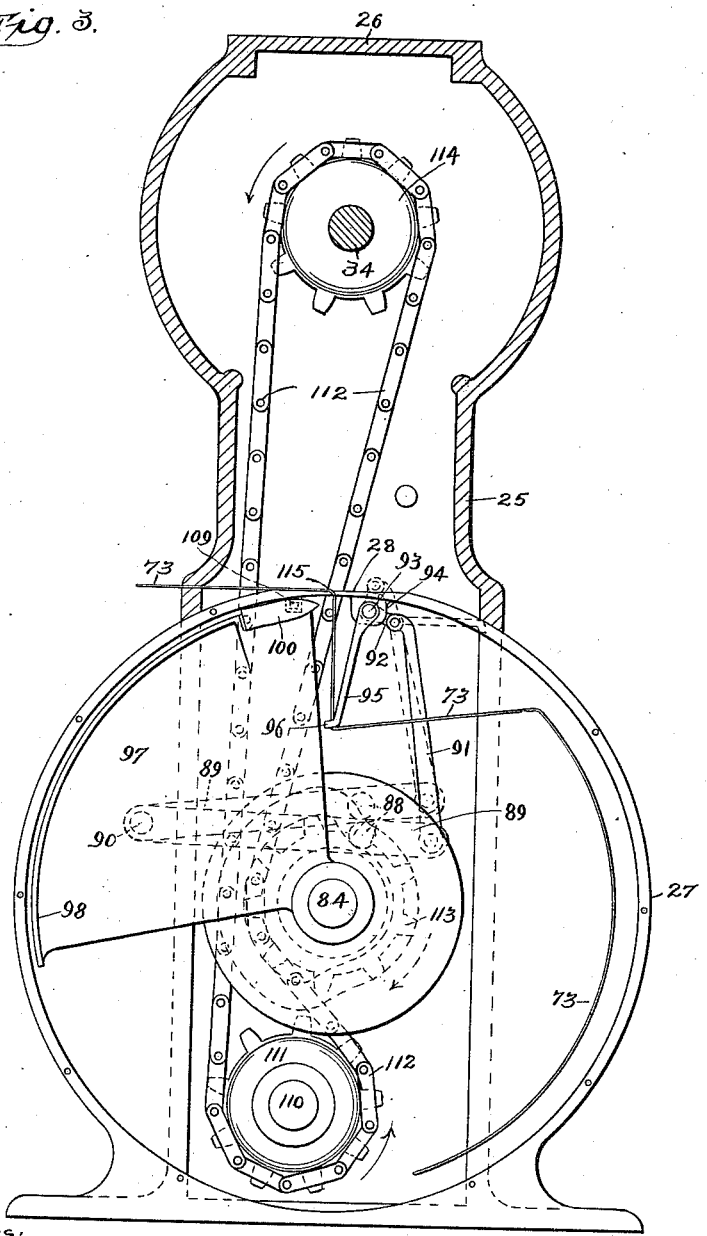
Figure 4:
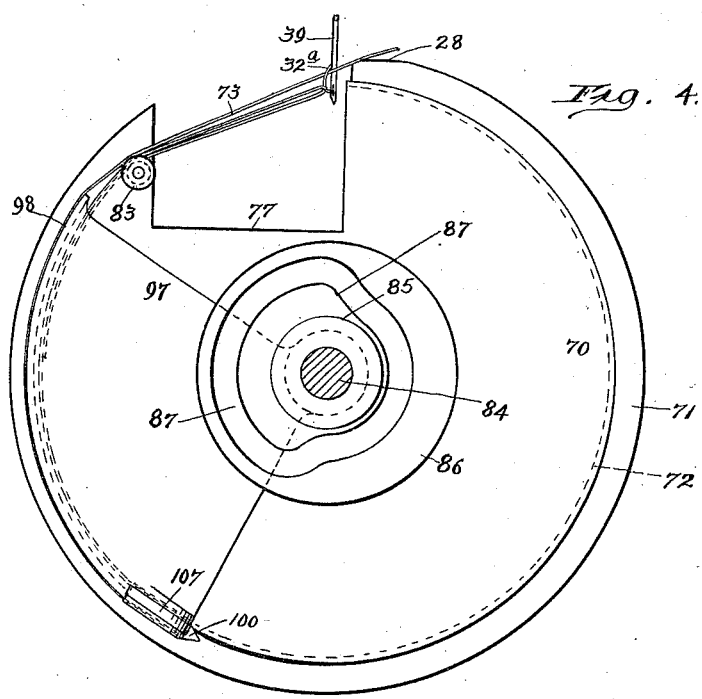
Figure 5:
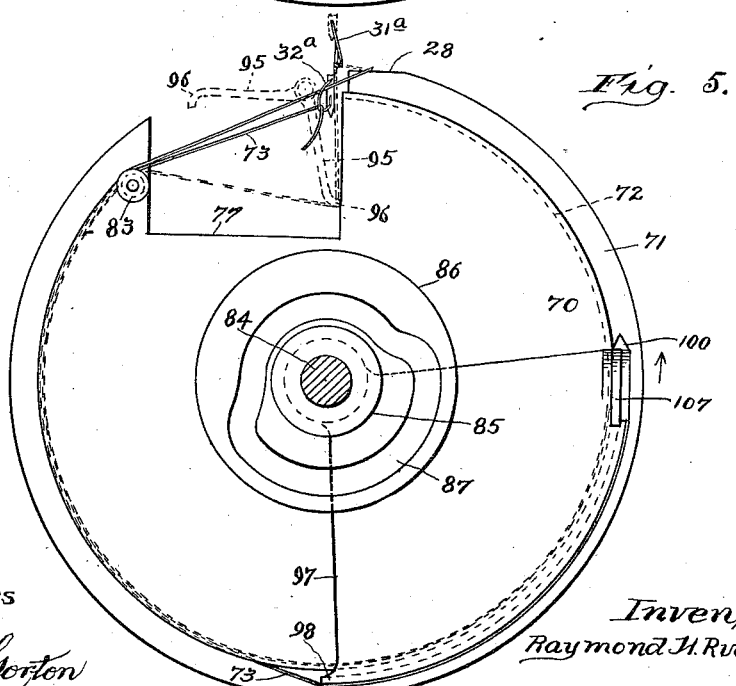

In the accompanying drawings which serve to illustrate an embodiment of the invention:—Figure 1, is a front view in elevation of the complete machine; Fig. 2, is a central vertical sectional view looking in the direction indicated by the arrows shown in Fig. 1; Fig. 3, is a view partly in section and partly in elevation taken on line 3—3 of Fig. 2, looking in the direction indicated by the arrows and showing the face plate for the lower portion of the frame removed; Fig. 4, is an inner view of the face plate of the lower portion of the frame of the machine, showing the shuttle carrier and the cam-race for operating the placer or tracker for the lower thread, and illustrating said lower thread in the act of being carried through the loop of the needle or upper thread by the shuttle; Fig. 5, is a similar view of like parts, but showing the shuttle and its carrier advanced to almost a point to cause the free end of the lower thread to be withdrawn from the loop of the needle thread, and also illustrating by dotted lines the action of the placer or tracker in the operation of locating the lower thread in position to be again passed through the loop of the needle thread by the shuttle; Fig. 6, is a diagrammatic plan view of a portion of the carrying and closing mechanism for the shuttle and the tracker or placer for the lower thread, illustrating the shuttle in its open position by continuous lines and in its closed position and in the act of passing through the loop of the needle thread by dotted lines; Fig. 7, is a front view in elevation of a portion of the lower part of the frame of the machine, a part of the shuttle carrier, and a portion of the placer or tracker for the lower thread, showing the parts arranged in about the positions they will occupy just before the shuttle engages the lower thread to carry the same through the loop of the upper thread; Fig. 8, is a rear end view of the shuttle, detached; Fig. 9, is a side view partly in section and partly in elevation of the shuttle, showing its jaws open; Fig. 10, is a similar view thereof showing the jaws or clamping members closed; Fig. 11, is a front view of a portion of the upper part of the frame of the machine showing the means for regulating the movement of the awl; Fig. 12, is a side view of like parts; Fig. 13, is a detached outer perspective view of the adjusting block for the guide of the feeding and piercing bars of the awl; Fig. 14, is a similar view of the inner surface of said block; Fig. 15, is a detached perspective view of the guide for the awl bars; Fig. 16, is a view in side elevation of the bar which imparts the feeding movement to the awl, showing the cam and cam-frame for operating the same; Fig. 17, is a similar view of the awl-carrying or piercing bar, showing the cam and cam-frame for operating the same; and Fig. 18, is a view in side elevation of the upper portion of the frame of the machine, showing the mechanism for regulating and guiding the feeding and piercing bars for the awl.

Like numerals of reference, refer to corresponding parts throughout the different views of the drawings.

The main frame or casing of the machine may be made of any suitable size, form and material, but in the present instance it is shown as being made of a single casting designated as a whole by the reference numeral 25, having upper and lower portions 26, and 27, respectively, the upper front portion of the lower part 27, being provided with a bed-plate 28, having apertures for the needle and awl as usual. Vertically mounted on the upper portion of the frame above the bed-plate 28, thereof, is a presser-foot bar 29, which may be of the ordinary construction and operated in the ordinary or any well known way. The front portion of the upper part of the frame is also equipped with a well known tension device 30, and a take-up lever 31, of the ordinary construction and operation for the upper or needle-thread 31ª, the spool 32, of which may be mounted on a spindle 33, extended from the upper portion of the frame. Horizontally journaled in the upper portion of the frame and extending from near the front surface thereof, to and through the rear surface thereof, is a shaft 34, which has mounted on its front portion a cam-wheel 35, which is provided in its face with a cam-race 36, for the operation of a roller 37, journaled on the needle bar 38, which bar is vertically mounted in a suitable guideway in the front upper portion of the frame and carries at its lower end a needle 39, which has an eye near its point, and may be suitably fixed to said bar. Mounted on the shaft 34, near the inner surface of the cam 35, is a cam 40, surrounding which is a cam-frame 41, on the upper portion of a bar 42, which has at its lower end a laterally and outwardly extended projection 43, in the lower portion of which is fitted the awl 44, which may be held in place by means of a set screw 45, seated in said projection, all of which will be readily understood by reference to Fig. 18, of the drawings. Mounted on the shaft 34, at the inner surface of the cam 40, is another cam 46, surrounding which is a cam-frame 47, on the upper portion of a bar 48, which bar regulates the feeding movement of the awl and is located rearwardly of the bar 42, but so as to have an independent movement therefrom. The cams 35, 40, and 46, are preferably secured together by means of a bolt 49, extended through suitable openings therein.

Mounted on the rear portion of the shaft 34, is a gear 50, which meshes with a pinion 51, mounted on a stub shaft 52, horizontally journaled on the rear portion of the frame. Mounted on the stub shaft 52, is a hand wheel 53, which is provided with a handle 54, used for turning said wheel to transmit power to the shaft 34, by means of which the cams 35, 40, and 46, are rotated, and the needle bar, awl-carrying bar and awl feed movement bar operated. The wheel 53, is provided on its outer surface with a circumferentially grooved extension 55, to which power may be applied by means of a belt when it is desired to operate the machine otherwise than manually.

Horizontally journaled on the frame 25, and extending slightly beyond its front and rear surfaces above the bed-plate 28, is a shaft 56, which has mounted on its front end an arm 57, provided at its free end with a forwardly projecting pin 58, which is adapted to fit in a transversely disposed recess 59, with which the inner surface of the adjusting block 60, for the guide 61, for the bars 42, and 48, is provided. The adjusting block 60, as shown in Figs. 13, and 14, is provided on each of its sides with recesses 62, to receive guide pieces 63, which are secured on the front portion of the frame just above the bed-plate 28, and preferably in vertically inclined positions as shown in Fig. 1, so that the block 60, may be raised or lowered between the pieces 63, and held in the desired position which is performed by means of a handle 64, mounted on the rear end of the shaft 56, which handle has pivotally mounted thereon a gripping pawl 65, the lower portion of which is adapted to engage the teeth of a segmental rack 66, on the rear portion of the frame 25, at one side thereof. The upper portion of the gripping pawl is pressed outwardly by means of a spring 67, which is interposed between the pawl and handle 64, as is clearly shown in Fig. 12, of the drawings. By turning the handle 64, in the proper direction, it is apparent that the shaft 56, will be rotated, thereby, and that as the pin 58, extends into the recess 59, of the block 60, the latter will be raised or lowered, when by releasing the gripping pressure on the pawl 65, the spring 67, will cause its lower end to engage the teeth of the rack 66, and thus hold the shaft 56, against rotation and the block 60, in the desired position. The guide 61, which as shown in Fig. 15, is vertically channeled and has in its rear lower portion an opening 68, to receive a pin 69, on the front portion of the block 60, is pivotally mounted on said pin and block so as to have movement on the outer surface of said block without hindrance by means of the guide pieces 63, between which the said adjusting block is mounted. The lower ends of the bars 42, and 48, are extended into the upper portion of the channeled guide 61, as is clearly shown in Figs. 1, 16, 17, and 18, of the drawings, so as to have vertical movement therein.

The lower portion 27, of the machine frame is by preference substantially circular in shape and hollow as shown and has secured on its front portion or face, a face-plate 70, which is provided on its inner surface with a peripheral recess or shuttle race 71, and a peripheral groove 72, for the reception of the lower or shuttle-thread 73, which may be supplied from a spool 74, mounted on a spindle 75, extended from the lower portion of the frame 25, and said thread may pass around a suitable tension regulating device 76, mounted on the frame near its spool. The upper portion of the face-plate 70, is provided with a doorway or cut away portion 77, to permit of access to the interior of the lower part of the frame for the purpose of placing the lower thread 73, therein, as well as for other purposes, and said doorway may be closed by means of a door 78, hinged as at 79, to the face-plate at one side of the opening therein, as is clearly shown in Fig. 1, of the drawings. The face plate 70, is provided at the opposite side of its doorway 77, from that on which the hinges are located with a catch-lug or boss 80, to engage an eccentric 81, pivoted on the door 78, which eccentric is provided with a handle 82, used for turning the same so as to cause it to engage or be released from the catch 80, thus fastening or unfastening the door. On its inner surface near one side of the doorway, 77, therein, the face-plate has journaled thereon a grooved roller 83, over which the lower-thread 73, will pass in the operation of the machine. Extended centrally through the face plate 70, and through the rear portion of the part 27, of the casing, is a stationary shaft 84, on which is rotatably mounted a sleeve 85, which has on its front portion an enlargement 86, provided on its inner surface with a cam-race 87, for engagement with a roller 88, journaled on a link 89, near one of its ends the other end of which is pivotally secured as at 90, to the inner surface of the lower portion of the frame at one side of the shaft 84, and above the same. Pivotally secured to the other end of the link 89, is one end of a link 91, which is pivotally connected at its upper end to an arm 92, rigidly secured to one end of a shaft 93, which is journaled in a bearing 94, on the lower surface of the bed-plate 28.

Rigidly mounted on the front end of the shaft 93, is the lower-thread tracker arm 95, which has at its lower end an extension 96, which projects forwardly into the path of the lower-thread 73, and is used for the purpose to be presently explained. Extended from the enlargement 86, on the sleeve 85, is the shuttle-carrier 97, which is herein shown as being segmental in shape and extended at its outer edge to near the inner periphery of the lower portion 27, of the frame. This carrier is provided at its outer edge with an overhanging flange 98, which projects into the recess 71, and over the groove 72, of the face-plate, and has at its front outer portion a recess 99, to receive the shuttle which is designated as a whole by the reference numeral 100, and consists of two members 101, and 102, pivotally connected together near one of their ends. The member 102, is provided with a cavity 103, to receive an elongated projection 104, on the member 101, and a spring 105, is located in the cavity 103, to normally hold the front ends of the members apart as is clearly shown in Figs. 6, and 9, of the drawings. As shown in the last-named figure, the member 102, is provided near its front end with a recess 106, in its surface adjacent to the front end of the member 101, so that when said members are closed as shown in Fig. 10, the lower or shuttle-thread 73, will be held in said recess, yet in such a manner as to pass therethrough. The front outer portion of the carrier 97, has fulcrumed in a suitable opening therein, coinciding with the front portion of the member 102, of the shuttle, an actuating lever 107, for said member, which lever is provided with a projection 108, to rest against the member 102, as will be clearly understood by reference to Fig. 6, of the drawings.

Journaled on the lower surface of the bed-plate 28, at one side of the opening therein for the needle and in the path of the lever 107, is a roller 109, which is adapted to contact with the lever 107, and press it against the member 102, of the shuttle so as to close said member against the member 104, of the shuttle in the forward movement of the shuttle carrier, as will be understood by reference to the dotted lines shown in Fig. 6, of the drawings, in which dotted line positions the shuttle is shown in the act of passing through the loop formed by the needle-thread and in the act of carrying the lower or shuttle-thread 73, therethrough. As soon as the lever 107, has passed out of contact with the roller 109, in the forward movement of the shuttle and its carrier, it is apparent that the spring 105, will open the jaws or members 101, and 102, of the shuttle, thus guiding the thread 73, and allowing it to pass over the front end of the projection 104, of the shuttle.

Mounted on a suitable shaft 110, journaled on the rear lower portion of the frame, is a sprocket wheel 111, over which is passed a sprocket chain 112, which engages with one of its sides the teeth of a sprocket wheel 113, mounted on the sleeve 85, to rotate therewith. The sprocket chain 112, is also extended over a sprocket wheel 114, fixed on the driving shaft 34, in the upper portion of the frame.

From the foregoing and by reference to the drawings, it will be readily understood and clearly seen that by opening the door 78, in the face-plate 70, a portion of the lower-thread 73, may be drawn from the spool 74, and passed through a suitable opening 115, for said thread in the bed-plate, and the free end of said thread allowed to hang down in the cavity of the lower portion of the frame, after which the door 78, may be closed. After this has been done, assuming that the shuttle 100, and its carrier 97, are in the positions shown in Fig. 1, of the drawings, and that the machine is started, which may be performed by rotating the wheel 53, thereby imparting movement to the other movable members of the machine, the needle 39, will be forced downwardly through one of the openings in the work formed by the awl 44, and carry with it a portion of the upper or needle thread 31$^a$, thereby forming a loop 32$^a$, just below the bed-plate and in the path of the shuttle. In the forward movement of the shuttle and its carrier, the tracker arm 95, for the lower-thread will, through the instrumentality of the cam-race 87, the roller 88, link 91, arm 92, and shaft 93, be thrown down into about the positions shown in Figs. 1, 3, and 7, so as to place the extension 96, on said arm in the path of and against the thread 73, so that in the forward movement of the shuttle, said thread will be caught between the front ends of the members 101, and 102, of the shuttle and carried through the loop 32$^a$, of the needle-thread, in such a manner that a part of the thread 73, will lie on the upper surface of the projection 104, of the shuttle and another part of said thread on the lower portion thereof, so as to lie in the groove 72, of the face plate as the shuttle traverses the recess or shuttle-race 71, in said plate. After the shuttle shall have traveled to a point a little beyond that shown in Fig. 5, of the drawings, it is apparent that the free end of the lower thread 73, will be drawn through the loop 32$^a$, when the latter will be drawn upwardly into the work and a lock stitch formed. As the shuttle continues its course in the race therefor, and just before it reaches the lower-thread 73, the needle will again descend and form another loop through which the shuttle will pass and carry the lower thread 73, therewith, said thread being held in the path of the shuttle by the extension 96, of the tracker arm until the free end of the thread is drawn through the loop, when the latter will again be drawn upwardly into the work and a lock stitch formed. This operation will be performed in each of the revolutions of the shuttle and its carrier, and it will be understood that as the shuttle passes the roller 109, the lever 107, contacting with said roller will press the member 102, of the shuttle against the member 101, and embrace the thread, which the shuttle will guide until it, the shuttle, shall have passed mainly through the loop 32$^a$, at which time the lever 107, will pass out of contact with the roller 109, thus allowing the spring 105, to force the front ends of the members 101, and 102, apart, so that the thread can pass over the projection 104, of the shuttle in the progress of the latter. By turning the shaft 56, by means of the handle 64, thereon, it is apparent that the adjusting block 60, may be raised or lowered so as to regulate the feeding stroke of the awl 44, the bars 42, and 48, of which are movably located in the guide 61, which is pivotally mounted on the adjusting block 60, as above described.

Having thus fully described my invention what I claim as new and desire to secure by Letters-Patent is—

1. In a machine of the character described, the combination with the main frame having a bed-plate, of a needle and an awl operatively mounted above the bed-plate, a thread-embracing and guiding shuttle mounted below the same, a tracker-arm for the shuttle-thread mounted below the bed-plate, and means to operate the shuttle and to raise and lower said arm.

2. In a machine of the character described, the combination with the main frame having a bed-plate, of a needle and an awl operatively mounted above the bed-plate, a thread guiding shuttle having means to cause it to embrace the thread, a tracker-arm for the shuttle-thread mounted below the bed-plate, and means to operate the shuttle and to raise and lower said arm.

3. In a machine of the character described, the combination with the main frame having a bed-plate, of a needle and an awl mounted above the bed-plate, means to reciprocate both the needle and the awl vertically, means to impart a back and forth movement to the awl, a thread-embracing, and thread guiding shuttle mounted below the bed-plate, a tracker-arm for the shuttle-thread mounted below the bed-plate, and means to operate the shuttle and to raise and lower said arm.

4. In a machine of the character described, the combination with the main frame having a bed-plate, of a needle and an awl mounted above the bed-plate, means to reciprocate both the needle and the awl vertically, means to impart a back and forth movement to the awl, a thread-embracing and thread-guiding shuttle mounted below the bed-plate, a tracker-arm for the shuttle-thread mounted below the bed-plate, means to automatically cause the shuttle to embrace its thread, and means to operate the shuttle and to raise and lower the tracker-arm.

5. In a machine of the character described, the combination with the main frame, of a needle and an awl mounted on the upper portion thereof, means to reciprocate both the needle and the awl vertically, means to impart a back and forth movement to the awl, a thread-embracing and thread-guiding shuttle mounted on the lower portion of the frame, a tracker-arm for the shuttle-thread mounted on the lower portion of the frame, means to automatically cause the shuttle to embrace its thread, and means to operate the shuttle and to raise and lower the tracker-arm.

6. In a machine of the character described, the combination with the main frame having a compartment in its lower portion, of a needle and an awl mounted on the upper portion of the frame, means to reciprocate both the needle and the awl vertically, means to impart a back and forth movement to the awl, a face-plate for the compartment in the lower part of the frame and having on its inner surface a peripheral recess, a shaft horizontally mounted on the lower portion of the frame, a sleeve rotatably mounted on said shaft and having an enlargement provided with a cam-race, a shuttle carrier extended from said enlargement, a shuttle mounted on said carrier, a tracker-arm for the shuttle-thread pivotally mounted on the lower portion of the frame, a link pivoted at one of its ends on the main frame, a connection loosely uniting the other end of said link to the tracker-arm, a roller on said link engaging the cam-race on said enlargement, and means to rotate the enlargement.

7. In a machine of the character described, the combination with the main frame having a compartment in its lower portion, of a needle and an awl mounted on the upper portion of the frame, means to reciprocate both the needle and the awl vertically, means to impart a back and forth movement to the awl, a face-plate for said compartment having on its inner surface a peripheral recess or shuttle-race, a sleeve rotatably mounted within said compartment, a shuttle-carrier carried by said sleeve, a shuttle mounted on said carrier and consisting of two members pivotally connected together near one of their ends, one of said members having a cavity in its inner surface and provided with a recess near its front end and the other of said members having a projection to fit in said cavity, a spring interposed between said members, a lever fulcrumed on the shuttle-carrier to engage the recessed member of the shuttle, means located in the path of said lever to depress the same, and means to rotate the aforesaid sleeve.

8. In a machine of the character described, the combination with the main frame having a compartment in its lower portion, of a needle and an awl mounted on the upper portion of the frame, means to reciprocate both the needle and the awl vertically, means to impart a back and forth movement to the awl, a face-plate for said compartment having on its inner surface a peripheral recess or shuttle-race, a sleeve rotatably mounted within said compartment and having an enlargement provided with a cam-race, a shuttle carrier carried by said sleeve, a shuttle mounted on said carrier and consisting of two members pivotally connected together near one of their ends, one of said members having a cavity in its inner surface and provided with a recess near its front end and the other of said members having a projection to fit in said cavity, a spring interposed between said members, a lever fulcrumed on the shuttle carrier to engage the recessed member of the shuttle, means located in the path of said lever to depress the same, a tracker-arm for the shuttle-thread pivotally mounted on the lower portion of the frame, a link pivoted at one of its ends on the main frame, a connection loosely uniting said link to the tracker-arm, a projection on said link extended into said cam-race, and means to rotate the aforesaid sleeve.

9. In a machine of the character described, the combination with the main frame having a compartment provided with an annular shuttle race, of a shuttle carrier rotatably mounted within said compartment, means to rotate said carrier, a shuttle mounted on the carrier and adapted to travel in the race therefor, said shuttle consisting of two members pivotally connected together near one of their ends, one of said members provided with a recess on its surface adjacent to the other member, a spring interposed between said members, a lever fulcrumed on the shuttle carrier to engage the recessed member of the shuttle, and means located in the path of said lever to depress the same.

10. In a machine of the character described, the combination with the main frame having a compartment provided with an annular shuttle race, of a shuttle carrier rotatably mounted within said compartment, means to rotate said carrier, a shuttle mounted on the carrier and adapted to travel in the race therefor, said shuttle consisting of two members pivotally connected together near one of their ends, one of said members having a cavity in its inner surface and provided with a recess near its front end and the other of said members having a projection to fit in said cavity, a spring interposed between said members, a lever fulcrumed on the shuttle carrier to engage the recessed member of the shuttle, and means located in the path of said lever to depress the same.

11. In a machine of the character described, the combination with the main frame having a compartment provided with an annular shuttle race, of a shuttle carrier rotatably mounted within said compartment, means to rotate said carrier, a shuttle mounted on the carrier and adapted to travel in the race therefor, a tracker-arm for the shuttle thread pivotally mounted for movement in a vertical plane and extended into said compartment, and means to raise and lower said arm.

RAYMOND H. RUDOLPH.

Witnesses:
CHAS. C. TILLMAN,
J. E. HANSEN.

Copies of this patent may be obtained for five cents each, by addressing the "Commissioner of Patents, Washington, D. C."